US006901376B1

(12) United States Patent
Sculler et al.

(10) Patent No.: US 6,901,376 B1
(45) Date of Patent: May 31, 2005

(54) METHOD AND SYSTEM FOR FACILITATING RESELLER TRANSACTIONS

(75) Inventors: Steven J. Sculler, Morganville, NJ (US); Mitchell L. Stevelman, Ringwood, NJ (US)

(73) Assignee: M&R Marking Systems, Inc., Piscataway, NJ (US)

( * ) Notice: Subject to any disclaimer, the term of this patent is extended or adjusted under 35 U.S.C. 154(b) by 340 days.

(21) Appl. No.: 09/658,977

(22) Filed: Sep. 11, 2000

Related U.S. Application Data (60) Provisional application No. 60/153,183, filed on Sep. 10, 1999, and provisional application No. 60/214,632, filed on Jun. 28, 2000.

(51) Int. Cl.$^7$ .............................................. G06F 17/60
(52) U.S. Cl. ...................................................... 705/26
(58) Field of Search ............................. 705/26, 27, 37, 705/82, 28; 709/219; 713/168; 719/21

(56) References Cited

U.S. PATENT DOCUMENTS

| | | | |
|---|---|---|---|
| 5,555,496 A | | 9/1996 | Tackbary et al. |
| 5,812,769 A | | 9/1998 | Graber et al. |
| 5,832,449 A | | 11/1998 | Cunningham |
| 5,848,399 A | | 12/1998 | Burke |
| 5,870,717 A | | 2/1999 | Wiecha |
| 5,895,455 A | | 4/1999 | Bellinger et al. |
| 5,970,475 A | * | 10/1999 | Barnes et al. ................. 705/27 |
| 6,058,417 A | * | 5/2000 | Hess et al. ................... 709/219 |
| 6,088,702 A | | 7/2000 | Plantz et al. |
| 6,131,088 A | | 10/2000 | Hill |
| 6,141,666 A | | 10/2000 | Tobin |
| 6,167,378 A | * | 12/2000 | Webber, Jr. ..................... 705/8 |
| 6,188,994 B1 | | 2/2001 | Egendorf |
| 6,249,772 B1 | | 6/2001 | Walker et al. |
| 6,260,024 B1 | * | 7/2001 | Shkedy ........................ 705/37 |
| 6,263,317 B1 | * | 7/2001 | Sharp et al. ................... 705/26 |
| 6,263,371 B1 | * | 7/2001 | Geagan et al. ............... 709/231 |
| 6,292,894 B1 | * | 9/2001 | Chipman et al. ............ 713/168 |
| 6,307,573 B1 | | 10/2001 | Barros |
| 6,324,521 B1 | | 11/2001 | Shiota et al. |
| 6,324,522 B2 | * | 11/2001 | Peterson et al. ............... 705/28 |
| 6,324,541 B1 | | 11/2001 | de l'Etraz et al. |
| 6,332,146 B1 | | 12/2001 | Jebens et al. |
| 6,336,100 B1 | | 1/2002 | Yamada |
| 6,338,050 B1 | * | 1/2002 | Conklin et al. ................ 705/80 |
| 6,343,273 B1 | | 1/2002 | Nahan et al. |
| 6,343,275 B1 | | 1/2002 | Wong |
| 6,344,853 B1 | | 2/2002 | Knight |
| 6,351,738 B1 | * | 2/2002 | Clark ........................... 705/37 |
| 6,381,510 B1 | | 4/2002 | Amidhozour et al. |
| 6,381,582 B1 | | 4/2002 | Walker et al. |

(Continued)

FOREIGN PATENT DOCUMENTS

JP    11212921 A   *   8/1999   ........... G06F/15/00

OTHER PUBLICATIONS iPrint, Inc. Technology Selected to Power Leading Office Services Franchise; Business Wire; New York; Feb. 8, 1999, Business Editors and "iPrint.com to Offer Free Picture Mug to Intel WebOutfitter Service Members"; Business Wire; New York; Aug. 17, 1999.*

(Continued)

*Primary Examiner*—Jeffrey A. Smith
*Assistant Examiner*—Robert E. Rhode, Jr.
(74) *Attorney, Agent, or Firm*—Lerner, David, Littenberg, Krumholz & Mentlik, LLP (57) ABSTRACT

A computer-implemented method and system is provided which retrieves interrelated agreements between the buyers and sellers of products and/or services. In one implementation, the products are personalized, and the personalization information is passed up the chain of distribution.

43 Claims, 4 Drawing Sheets

U.S. PATENT DOCUMENTS

| | | |
|---|---|---|
| 6,411,935 B1 | 6/2002 | Gilles et al. |
| 6,434,536 B1 | 8/2002 | Geiger |
| 6,449,599 B1 | 9/2002 | Payne et al. |
| 6,453,302 B1 | 9/2002 | Johnson et al. |
| 6,453,306 B1 | 9/2002 | Quelene |
| 6,460,020 B1 | 10/2002 | Pool et al. |
| 6,460,072 B1 | 10/2002 | Arnold et al. |
| 6,463,418 B1 | 10/2002 | Todd |
| 6,463,420 B1 | 10/2002 | Guidice et al. |
| 6,473,738 B1 | 10/2002 | Garrett |
| 6,535,294 B1 | 3/2003 | Arledge, Jr. et al. |

OTHER PUBLICATIONS

"iPrint, Inc. Technology Selected to Power Leading Office Services Franchise"; Business Wire; New York; Feb. 8, 1999, Business Editors.*

"iPrint.com to Offer Free Picture Mug to Intel WebOutfitter Service Members"; Business Wire; New York; Aug. 17, 1999; Business Editors/Technology Writers.* http://www109.imprint.com, 26 selected pages.

http://www.easiestbiz.com, 19 selected pages.

* cited by examiner

METHOD AND SYSTEM FOR FACILITATING RESELLER TRANSACTIONS

The present application claims the benefit of U.S. Provisional Patent Application Nos. 60/153,183 and 60/214,632 filed Sep. 10, 1999 and Jun. 28, 2000, respectively, listing the same inventors, and the disclosure of both applications are hereby incorporated by reference.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

Computerized systems have long been used in connection with the ordering and selling of products and services. However, typically, the systems are designed to handle a single level in any channel of trade. For example, a web site may have product-ordering software which allows the consumer to order products on-line. In turn, the seller will typically use a different computer program to order products from its own vendors. The vendors, in turn, may have their own suppliers who also have there own product-ordering software.

While some companies may optimize their databases so that they can automatically generate purchase orders based upon automated customer requests, such software often needs to overcome the different formats required by the different software programs. The inefficiencies of such a system is increased by the fact that each entity will have its own separate product ordering and supply ordering software, with the concomitant need to convert their data from one format to another.

The disadvantages of such prior art systems are particularly manifest in products that contain personalized information, such as the typesetting associated with the impression of a stamp. Typically a customer will call or fax in an order. The reseller will write down the information and then typeset it or pass it on to another manufacturer. Thus, the image is sent up the chain of distribution until it finally reaches the company that makes the part containing the typesetting. Each of these steps leads to possible errors in the personalization. The image might go through many conversions, be it from paper to facsimile to one electronic format to another electronic form. Each conversion or handling by an intermediary entity increases the possibility of error.

Accordingly, there is a need for a centralized system serving the needs of multiple entities across a particular channel of trade which can automatically generate customer and supply orders in response to customer requests. There is a further need for a system which can resolve the accuracies inherent in ordering personalized products.

SUMMARY OF THE INVENTION

The invention is directed to those needs.

One embodiment of the invention provides a computer-implemented method of retrieving product distribution information. One step includes storing first and second relationship information. Relationship information identifies a buyer, a seller and a product to be provided from the seller to the buyer. The first relationship information identifies a first entity as the buyer, a second entity as the seller, and a first product as the product. The second relationship information identifies the second entity as the buyer, a third entity as the seller and the first product as the product.

Other steps include retrieving the first relationship information and then retrieving the second relationship information. The second relationship information is retrieved based on the identity of the seller and the identity of the product contained in the first relationship information.

Preferably, the method also includes storing and retrieving third relationship information, where third relationship information identifies the third entity as the buyer and yet another entity, the fourth entity as the seller. The third relationship information also identifies the product.

In one aspect, the first product is a part of a second product, and the first relationship identifies a product containing the part.

Desirably, the relationship information includes the compensation which the seller agrees to accept for the product from the buyer. The compensation may be the price of the product or a commission.

It is not necessary for the first entity to represent only a single company or person. Rather, the first entity identified by the first relationship may be a class of entities, such as the general public. The step of retrieving the first relationship information may include displaying to the first entity at least two products associated with those relationships identifying the first entity as the buyer. The first relationship information is retrieved based upon the product selected by the particular member of the class.

Advantageously, the method includes the step of storing a description of the product. The may be an image, a textual description, or an image and a textual description.

It is also preferable for the method to include the step of the first entity requesting the first product from the second entity and storing the request. A request for the first product by the second entity to the third entity is also stored based on the second relationship information that was retrieved. The third entity may be notified of the request, and the request may include the quantity and shipping destinations of the product.

The step of retrieving the second relationship information may comprise searching for relationships for wherever the buyer of the relationships being searched identifies the seller of the first relationship, and the product of the relationships being searched identifies the product of the first relationship.

Desirably, the method also includes the steps of storing additional relationships associated with the product and repeating the step of retrieving the second relationship. The step is repeated by recursively assuming that some of the values of the first relationship are equal to the values of the second relationship. The repeating step terminates when there is no relationship identifying the seller of the second relationship as a buyer of the same product in another relationship.

Another embodiment of the invention comprises a computer-implemented method of providing information about a product including typesetting. The method includes storing data representing (a) a typesetting-related product that is available from a first member to a class of customers the product including typesetting and (b) an agreement by a second member to provide the product to the first member. The method further includes receiving a request for the product from a customer of the class whereby the request includes information describing the typesetting. The customer request is stored and the agreement is retrieved based on the identity of the product and the first member associated with the customer's request. A second request is then generated whereby the second member is requested to provide the product to the first member. The second request also identifies the typesetting information. The second request is then transmitted to the second member.

The class of customers may actually include only a single entity.

Preferably, the method further includes storing data representing an agreement by a third member to provide the product to the second member. This agreement is retrieved based on the identity of the product and the identity of the second member.

The typesetting information may comprise an image. In one aspect, a plurality of requests are received from a plurality of customers in the class and the image associated with one customer's request is different from the image associated with another customer's request. When the customer requests are stored, the different images may be stored in the same file format or different file formats. The method may include the steps of (a) converting the image from the stored file format to a different file format and then (b) the second member retrieving the image. If the images are stored in different file formats, the stored file formats are preferably stored in formats corresponding with the file formats used by the members.

In another aspect, the product is a stamp, the typesetting relates to the impression on the stamp, and method includes the additional step of manufacturing the product.

Desirably, the requests identify the typesetting information by reference to information stored in a database and the customer request is received over a global telecommunications network such as the Internet, the World Wide Web or an intranet.

Yet another embodiment of the invention provides a computer-implemented method of retrieving information. The method includes storing first relationship information and second relationship information. The first relationship information identifies a first entity as the buyer, a second entity as the seller, and a first product as the product. The second relationship information identifies the second entity as the buyer, a third entity as the seller, and a second product as the product. Both the first relationship information and second relationship information are retrieved, however, the second relationship information is retrieved based on the identity of the seller identified in the first relationship information.

In a further embodiment of the invention, a system is used to store information about buyers and sellers of products. The system includes a database containing a plurality of relationship records. The system also includes a processor for retrieving a second relationship record based on a first relationship record, whereby the buyer entity identified in the second relationship record is the same entity as the seller identified in the second relationship record, and whereby the product identified in the second relationship record is related to the product identified in the first relationship record. Preferably, the database is stored at a central location on a single server.

In yet a further embodiment, a system is maintained by an administrator and used to store information about the relationships between buyers and sellers. The system includes data representing an agreement by a middle entity to provide a product to a bottom entity in exchange for compensation and an agreement by a top entity to provide a related product to the middle entity in exchange for compensation, none of the entities being the administrator. They system also includes a processor for utilizing the data to process a request for the product from the bottom entity to the middle entity such that the request generates a request for the product from the middle entity to the top entity. Desirably, the data further comprises another agreement by another entity to provide the product to the top entity.

In still another embodiment, a computer-implemented method is provided for retrieving information relating to a request for personalized products. The method includes storing an agreement by a second entity to provide a product to a first entity and storing an agreement by a third entity to provide the product to the second entity. The first entity requests the product from the second entity such that the request includes modifying the product in accordance with personalization information provided by the first entity. The personalization information is particular to the first entity. A request for the product from the second entity to third entity is then generated. The request is generated based on the stored agreements and includes the personalization information. The personalization information may be an image.

Another embodiment provides for a computer-implemented method of selling products over the worldwide web. It includes providing a database which centrally stores agreements between a plurality of members selling a product. It also includes: sending a web page from a first member to a customer, the web page identifying a product that is the subject of one of the agreements of the database; receiving a request for the product from the customer, the request including an image provided by the customer; generating a first purchase order from the first member to a second member based on a second agreement stored in the database, the purchase order including the image; and generating a second purchase order from the second member to a third member based on a third agreement stored in the database, the purchase order including the image. The method may also include the step of storing the agreements by sending information relating to the agreements to the database via the Internet.

Although all of the methods speak of products, it should be understood that a product as used in the context of this specification may also refer to a service or a product and a service.

DETAILED DESCRIPTION OF THE PREFERRED EMBODIMENTS

Figure 1:
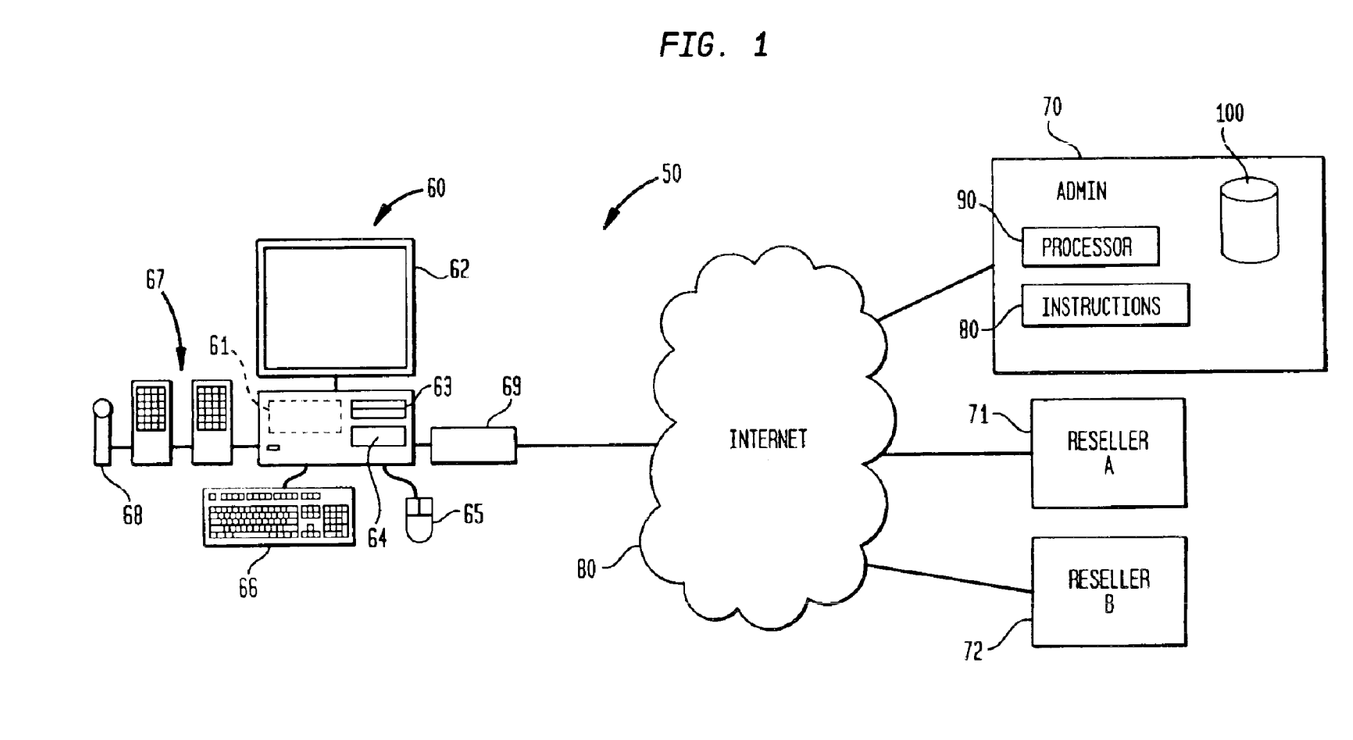
FIG. 1 is diagram of a system in accordance with one embodiment of the invention.

As shown in FIG. 1, a system 50 in accordance with one embodiment of the invention comprises a network of computers such as an end user personal computer 60 which communicates with web servers 70–72 via the Internet 80. Although only a few computers are depicted in FIG. 1, it should be appreciated that a typical system can include a large number of connected computers. Preferably, the end user computer 60 is a general purpose computer having all the internal components normally found in a personal computer such as, for example, central processing unit (CPU) 61, display 62, CD-ROM 63, hard-drive 64, mouse 65, keyboard 66, speakers 67, microphone 68, modem 69 and all of the components used for connecting these elements to one another. The end user computer 60 communicates with the Internet 80 via modem 69. The end user computer 60 may comprise any work station capable of processing instructions and transmitting data to and from humans and other computers, including PDA's with modems and Internet-capable wireless phones.

Web servers 70–72 contain hardware for sending and receiving information over the World Wide Web, such as web pages or files. The web servers 70–72 may be typical web servers or any computer network server or other automated system capable of communicating with other computers over a network, including the Internet, wide area networks or local area networks. For example, the system described above in connection with end user computer 60 may also function as a web server.

Particularly, administrative web server 70 contains a processor 90, a set of instructions 80 which are executed by processor 90, and a variety of data such as Reseller Database 100. Preferably, the instructions 80 are stored as a program on the hard drive of the administrative server 70 and contain routines, such as functions and methods, for handling input/output and for accessing and manipulating the data in the database. The routines of the program are explained in more detail below.

Reseller Database 100 stores agreements and transactions between the entities served by the system 50 (hereafter "members") and the public. Preferably, the database is relational and contains multiple tables containing multiple records.

Figure 2:
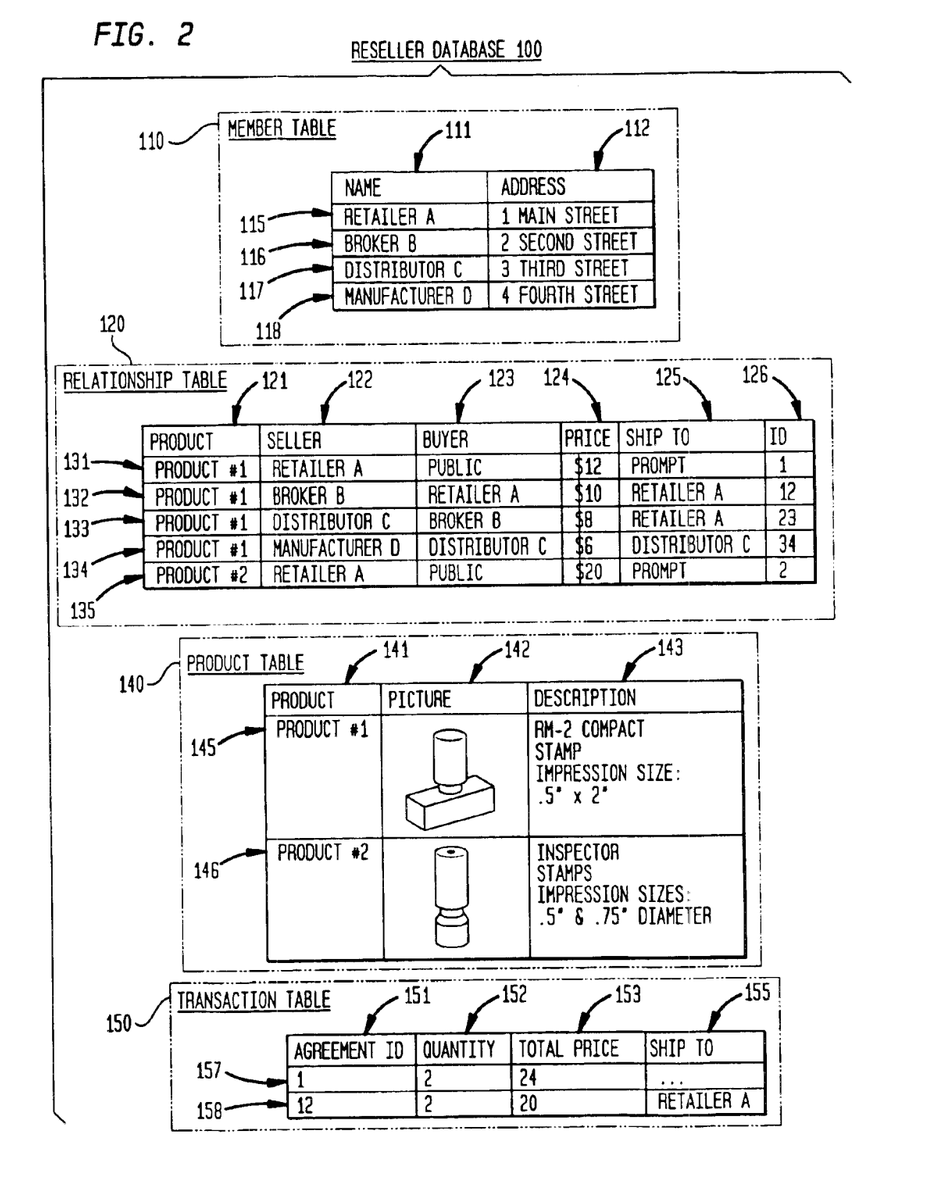
FIG. 2 is a diagram of a Reseller Database in accordance with one embodiment of the invention.

As shown in FIG. 2, one of those tables is Member Table 110. Member Table 110 stores information about the individual members. Each member occupies a record in the Member Table and the record includes the member's name 111 and biographical information such as the member's address 112, the nature of its business and the like. By way of example, record 115 of Member Table 110 may contain information about a company known as "Retailer A" whose name is stored in Name field 111 and whose address of 1 Main Street is stored in Address field 112. Exemplary records 116–18 correspond with three different companies having three different names (such as Broker B, Distributor C, Manufacturer D) and addresses.

Information regarding relationships between the members is also stored in Reseller Database 100. These relationships may include agreements to buy and sell products on pre-identified terms. For exemplary purposes only, this embodiment shall be discussed in the context of the following hypothetical business arrangement. Retailer A is a retailer that sells personalized products on-line by mail and one of those products shall be considered to be a stamp known as Product #1. Retailer A sells the product to the public for $12. As is typical for retailers, Reseller A does not manufacture Product #1, but, rather, buys Product #1 for $10 from another company, Broker B. Broker B, in turn, may simply be a broker for Product #1 and arranges delivery for Product #1 to Retailer A from a distributor, Distributor C, for which Broker B pays Distributor C $8. Distributor C, in turn, buys Product #1 from the ultimate manufacturer, Manufacturer D, for $6.

Relationship Table 120 of Reseller Database 100 stores this contractual information in records 131–134. Each record contains a number of fields such that Product field 121 identifies the product, Seller field 122 identifies the seller, Buyer field 123 identifies the buyer, Price field 124 identifies the price, and Ship To field 125 contains information about where the product should be shipped. For example, the relationship between Distributor C and Manufacturer D is stored in record 134 such that the Product field 121 has the value "Product #1", seller field 122 has the value "Manufacturer D", buyer field 123 has the value "Distributor C", price field 124 has the value $6, and Ship To field 125 has the value "Distributor C" because the product is shipped from Manufacturer D to Distributor C. The ID field 126 contains a value that uniquely identifies that particular relationship. The other relationships are similarly stored in Agreements Table 120.

Some companies are not only buyers, but they are also sellers. Relationship Table 120 stores both aspects. For example, the exemplary agreement between Broker B and Distributor C is stored in record 133 with the following values:

| Product 121 | Seller 122 | Buyer 123 | Price 124 | Ship To 125 | ID 126 |
|---|---|---|---|---|---|
| Product #1 | Distributor C | Broker B | $8 | Retailer A | 23 |

It will be noted that the Ship To field contains a different value than the buyer field, which reflects the fact that Broker B never actually receives the product. Rather the product is shipped directly from Distributor C to Retailer A, even though Broker B is paying the Distributor C the price of $8.

It is not always possible to know, in advance, the value of every field before a product is ordered. For example, while Retailer A knows that it will charge the public $12 for Product #1, it does not know until the time-of-sale who the purchaser is or where it will be shipped. In this instance, Relationship Table 120 contains codes which identify the missing information, such as:

| Product 121 | Seller 122 | Buyer 123 | Price 124 | Ship To 125 | ID 126 |
|---|---|---|---|---|---|
| Product #1 | Retailer A | Public | $12 | Prompt | 1 | whereby "Public" means that any member of the public may be a buyer and "Prompt" means that the system will prompt the buyer for the information at the time of sale. Accordingly, the system allows a retailer with a standard set of retail prices to store its retail prices in the database for public viewing even though the buyer's identity is unknown. Moreover, rather than defining the potential buyer as the entire public, other codes could be used to limit the potential buyers to a subset of the public or particular class of entities (such as "stamp retailers").

Reseller Database 100 also contains a table for centrally storing information about the products. Products Table 140 contains records whereby each record contains a Name field 141 for storing the name of the product, a Picture field 142 for storing a picture and a Description field 143 for storing a textual description of the product. Records 145 and 146 of FIG. 2 illustrate exemplary values.

Reseller Database 100 further contains another table for recording transactions facilitated by the system, namely Transaction Table 150. Records in the Transaction Table contain a reference to the agreement under which the transaction was made as well as fields devoted to the particulars of the transaction, such as the number of products sold, the total price and where the product should be shipped. These values are stored in the following respective fields: Relationship ID 151, Quantity 152, Total Price 153, and Ship To 155.

Preferably, Reseller Database 100 stores its information using conventional database storage products and query formats, such as products by Oracle, PICK and Universal. The system may conduct the searches using SQL. However, the database may contain information in any format, such as XML. Thus, a "record" refers to any item, or collection of items, of information in the database.

In accordance with the embodiment of the system described above, the invention may be operated as follows.

User 60 visits a web site relating to Retailer A and hosted by administrator server 70 and requests to see a list of all the products carried by the retailer.

Figure 5:
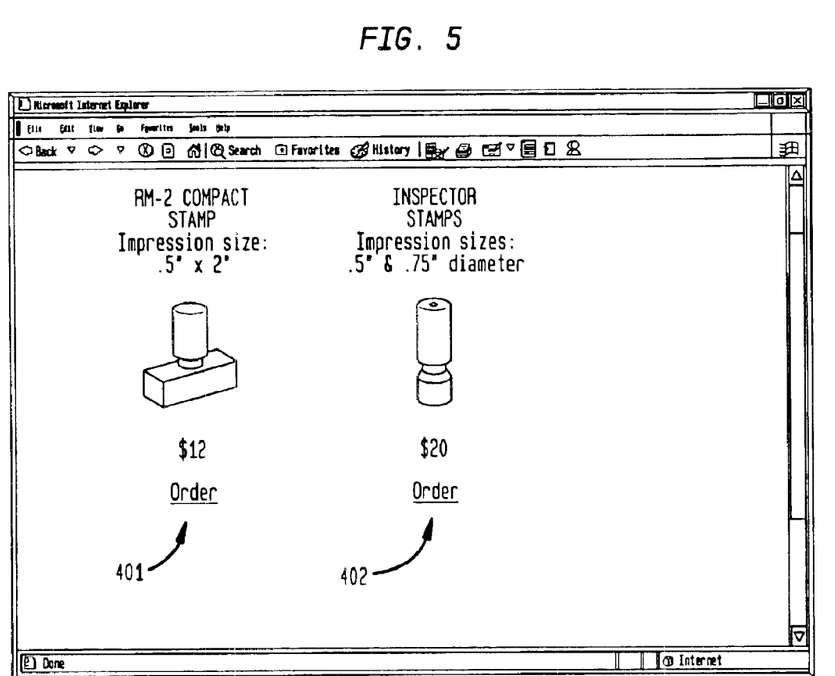
FIG. 5 is a screen display in accordance with one embodiment of the invention.

Pursuant to instructions 80, processor 90 searches Relationship Table 120 for all records listing the particular retailer in Seller field 122 and the string "Publics in the Buyer field 123. A list of matching products is compiled and shown to the potential customer using the information contained in the Product Table 140, namely the product's name, picture and description. The price is obtained from the Price field 124 of Relationship Table 120 and is also shown to the user. Using the foregoing example, records 131–32 of Relationship Table 120 and records 145–46 of Product Table 140 may have been pulled and displayed on a web browser such as shown in FIG. 5.

When the user orders the product, the selected product is matched to the particular relationship. In the embodiment shown in FIG. 5, the product information is shown separately for each relationship, i.e. product 401 shown in FIG. 5 corresponds with relationship record 131 of FIG. 2 and product 402 shown in FIG. 5 corresponds with relationship record 135 of FIG. 2. Accordingly, the relationship may be found simply by allowing the user to click on one of the pictures and sending this information to administrative server 70. In a manner well known to those of ordinary skill in the art, other information would also be collected such as the quantity desired, how payment will be made and where the product should be shipped.

The order is then stored in Transaction Table 150 by creating a record containing: the relationship pursuant to which the transaction was made, the quantity of product, the total amount paid, and where the product should be shipped. Using the foregoing example, if user 60 purchased 2 units of Product #1, record 157 will contain the following values: Relationship ID field 151 contains a value equal to the value contained in ID field 126 of record 131; Number Of Products field 152 contains the value 2; Total Price field 153 contains the value $24; and Ship To field 155 contains the user address.

Instructions 80 next determine whether the seller buys the product from another member of the system. One manner in which this search may be conducted is for processor 90 to search for all records in the Relationship Table 120 where the name in Buyer field 123 matches the seller, and the product in Product field 121 matches the product. Using the foregoing example, processor 90 will pull record 132 of Relationship Table 120 because the buyer in record 132, "Retailer A" matches the seller, also "Retailer A", from the previous transaction record 131.

If a record in Relationship Table 120 is found showing that the current seller is also a buyer of the same product, then the system automatically generates a new transaction using information already stored in the system. One manner in which this may be done is to create a new record in Transaction Table 150 using the information from the latest record found in the Relationship Table 120 and the previously stored record in Transaction Table 150. By way of the foregoing example, instructions 80 store a new record 158 in Transaction Table 150 such that the quantity 152 is the same as the quantity from the previous transaction (record 157) and the remaining information (Agreement ID 51, Quantity 142, Total Price 153 and Ship To 155, as applicable) are all pulled and computed from the record just found in Relationship Table 120 (record 132).

Once the new transaction is stored, the process repeats, namely, processor 90 continues to search Relationship Table 120 to see if the seller in the latest transaction is also listed as a buyer for the same product. If so, a new transaction is generated and the processor searches Relationship Table 120 again to see if the latest seller is also a buyer of the same product. Records 133–134 would thus be pulled and new transaction records created accordingly. In one embodiment, the system stops searching when it is unable to find any record of any entity selling that particular product to the then-current seller. There is substantially no limit to the length of the chain of transactions generated by a single order.

During or after the records are added to the Transaction Table 150, notifications of the transactions are sent to the members of the system so that the orders can be filled. Preferably, the system sends the information in a format consistent with the members' own product management software so that the orders can be filled with minimal human intervention. However, the notification may be made in other ways, such as by sending the members an e-mail each time they are involved in a transaction or periodic hard-copy reports.

Accordingly, when a member orders a product, the system automatically arranges a transaction based on previously-arranged business terms.

Figure 4:
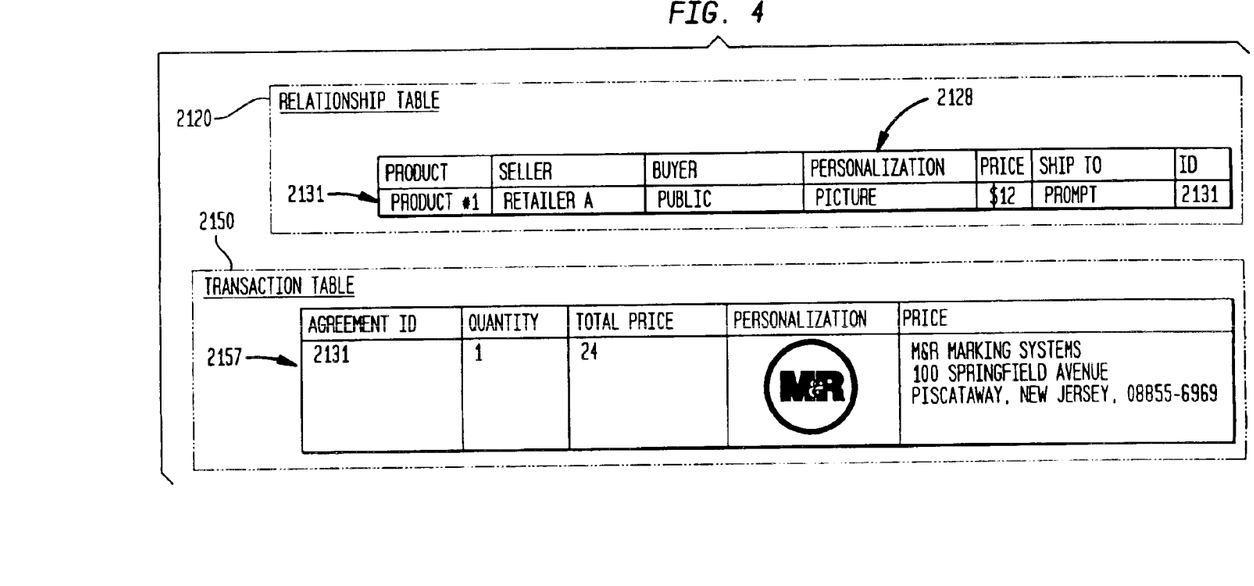
FIG. 4 is a diagram of a Relationship Table and a Transactional Table in accordance with yet another embodiment of the invention.

In yet another embodiment, the system also handles personalized products. For example, the end-user may upload a personalized image which the user wishes to appear on the products, such as the impression on a stamp. One manner in which this may be carried out is to add a Personalization field 2128 to the Relationship Table 2120 as shown in FIG. 4. If the field contains the value "Picture", then the system will prompt the buyer to upload a picture at the time the product is ordered.

The uploaded picture is then stored in the personalization field 2152 of a new record 2157 in Transaction Table 2150. When a member is informed of the transaction, the system provides the member with a pointer or reference to the stored image. Accordingly and advantageously, the image is not sent to entities that do not need it.

Preferably, all of the images are converted and stored in a single format. Prior art systems may have required a single company to maintain and use a different image converter for each imaging format used by its customers and vendors. In fact, the same image may have been converted to different formats many different times as the purchase order was passed up the chain. By storing all images in the database in a single format, the members need only know how to convert the image from one format—the system's—into their own. Indeed, the system preferably stores the member's particular imaging format in the respective record of Member Table 110 and automatically performs the conversion when the member accesses the image.

It is not necessary for the personalized information to be limited to images. The personalized information may also include information particular to the customer, like their name and address. Thus, the system can accommodate requests for product modifications that are not pre-stored in the system. In other words, while systems may be pre-configured for well-known options such as product color and size, the system of the invention is capable of automatically creating a cascade of purchase orders containing unanticipated product modifications (like the exact image to be placed on a stamp) particular to the ultimate customer.

The ability to transfer personalized information capitalizes on yet another advantage of the invention: nearly all of the data can be transmitted electronically. By electronically storing and passing along personalization information, it is not necessary to recreate typesetting or design at different levels of the chain of distribution.

The features of personalization, uploading of images and pipelining purchase orders work together to provide yet another advantage of the invention, namely the ability to order accurate typesetting on-line. In another embodiment of the invention, the customer uploads a picture, graphic file or other information representing typesetting. For example, a typeset image may be created on-line as part of the process of selecting a particular stamp, whereby the typesetting represents the impression made by the stamp. The system then converts the typesetting information into either a default graphic file format or the format needed by the manufacturer to create the product. The typesetting and design, which was created by the end user, is then centrally stored in the database and made available to the members of the system as described above.

Because the end user has done their own personalization and the manufacturer gets the graphic file from the database regardless of how many resellers the order may be passed through, the chance of error is greatly diminished. The ability to upload and centrally store typesetting information provides more advantages than simply decreasing errors. It saves time because it is not necessary to re-typeset and design the personalization by the manufacturer. Moreover, it avoids the labor required to pass that information on through reseller channels to the manufacturer. The accuracy of the automated system provides for streamlined operations and faithful reproductions of the end users design.

The typesetting-related aspect is not limited to stamps. Rather, it can be used with any typesetting-related product such as printed items or signs. For example, the invention could be used to order advertising specialties such as printed plates and the like.

The system is also flexible enough to handle many different pricing schemes. Rather than storing fixed prices in field 124, the field may contain a formula. A commission may be represented as a percentage multiplied by the Total Price 153 stored in the corresponding transaction record.

Moreover, the prices can be set and controlled by the database administrator. This is particularly advantageous when the system is primarily directed to the sale of the database administrator's goods.

On the other hand, the system may be configured to allow the members to create and store their own agreements. In this embodiment, instructions 80 include routines which allow a member ("the proposing member") to enter a proposed relationship with another member. If the other member implicated by the proposed relationship provides the system with confirmation, then the system will store the relationship in the system. Accordingly, members are allowed to store agreements without intervention by the entity operating the administrative server 70. Resellers can negotiate independently to determine their prices, terms and conditions but, when their information is stored in the system's database, the resellers still obtain the advantages of participating in the system.

Figure 3:
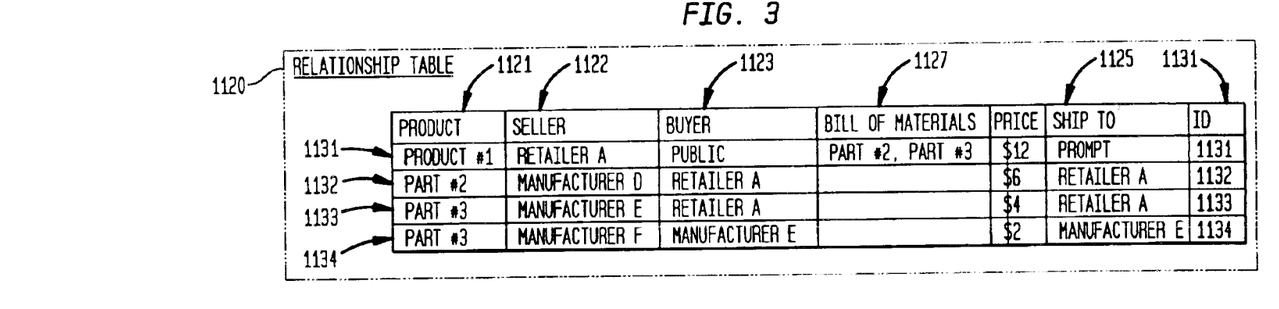
FIG. 3 is a diagram of a Relationship Table in accordance with another embodiment of the invention.

Yet another advantage of the invention is that it is not limited to complete products. Most manufacturers purchase one or more of a product's parts from different parties. The system may be configured such that purchase orders for products automatically generate purchase orders for the constituent parts. For example, as shown in FIG. 3, the Relationship Table 1120 may have a Bill of Material field 1127. In accordance with the operation discussed above, when the processor 90 pulls a record from Relationship Table 120, it checks the Bill of Material field 1127 to see if the sale of the product involves the sale of individual parts as well. If Bill of Material field 1127 is not null, then instead of checking whether the seller is also listed as a buyer in a different relationship record for the entire product, the system checks whether the seller is listed as a buyer for the individual parts. If so, i.e., if the seller of the product is also a buyer of the parts, then the process proceeds with the products/parts listed in the Bill of Material field 1127 in the same manner as described above in connection with Product #1.

By way of example, when record 1131 is pulled from Relationship Table 1120 of FIG. 3, the system checks the value of Bill of Material field 1127. Because Bill of Material field 1127 lists two different products, the system no longer checks to see if Retailer A buys Product #1 from another member. Rather, the system checks Product field 1121 of Relationship Table 1127 for records indicating that Retailer A buys the products contained in the Bill of Material field 1127, namely Part #2 and Part #3, from other members. For example, the system will pull record 1132 and record the sale of Part #2 from Manufacturer D to Retailer A as a transaction. Moreover, when the system pulls record 1133 showing that Manufacturer E sells Part #3 to Retailer A, the system will check to see if Manufacturer E buys Part #3 from another member. In response, the system will pull record 1134 showing that Manufacturer F sells Part #3 to Manufacturer E. Alternatively, rather than storing the Bill of Material field in the Relationship Table, the field may be added to Product Table 140, so that the system checks the Product Table for parts information.

Accordingly, an order for a single product may generate multiple distribution streams of parts. Indeed, some of the parts may come from the same company that requested the product. For instance, this may occur when a manufacturer sells a complete product but only makes some of the parts. In such a case, the manufacturer may list the parts that it provides in the database for internal accounting purposes.

Another advantage is that companies can sell more products and services than they would normally have access to or in inventory because they can make pre-arranged transactions that are automatically implemented without their intervention. This allows the members to seamlessly offer via the Internet, in-store, mail order or through any other barter or sale transaction a wide range of products and services. Because products can be shipped directly from one level of a chain of distribution to non-contiguous levels, the system also permits a consumer to order product from a reseller even if the reseller does not have the product on hand. The system also allows the order to be seamlessly passed on to other resellers who can fulfill the product orders either directly or indirectly back through the reseller.

Another advantage of the invention is the potential savings in shipping costs. For example, if a product is sold unchanged through three entities before going from the manufacturer to an end user, then rather than shipping that unit four different times the manufacturer may simply ship the unit directly to the end user. One method of implementing this alternative would be to place a code in Ship To field 125 in Relationship Table 120 that indicates that the value contained in Ship To field 155 of Transaction Table 150 should be passed up the chain of transactions. This is not only advantageous to resellers, who do not need to participate in the physical distribution of the product and are thus freed of the expense of receiving and making shipments, but it is also advantageous to the customer because shipments will often be quicker and less costly.

Preferably, the system does not provide members with access to transactions in which the member is not a direct buyer or seller. Often times, a broker will not want a manufacturer to know the identity of the broker's customers lest the manufacturer sell around the broker. Accordingly, although Broker B will be notified of its transactions with Retailer A and Distributor C, Broker B will not be notified of the transactions which are upstream or downstream of those transactions. In other words, transactions that do not directly involve a member are transparent to that member even if that member is somewhere in the chain of distribution of the product. This transparency has the added advantage of allowing consumers to buy products on-line and remain anonymous to every entity in the chain of distribution other than the retailer operating the web site. Orders can be passed from the bottom of the chain of distribution, through the middle and to the top, both automatically and substantially anonymously.

This transparency can extend to the personalized information provided by the customer. It is not necessary to allow all of the members of the chain of distribution to have access to the personalized information. Rather, there are instances in which only those entities which require the information in order to manufacture the product should have access to the personalized information. Accordingly, in another embodiment of the invention, the agreements table may be modified to include fields specifying whether a member has full, partial or no access to the personalized information such as the image contained in personalization field 2152 of FIG. 4. If the member has only partial access, then the member can see either portions of the image or, alternatively, the entire image at low resolutions. The low-resolution images are intended to allow the member to see the image but still prevent the member from using the image to make a product (due to the low quality of the image).

A further advantage of the invention is that the same product information can be used by different parties. Because product information is centrally stored in a single table, resellers are saved the expense of retyping the information provided by manufacturers. By way of example, it is common for manufacturers to sell products to distributors through brokers. The distributors, in turn, sell the product to retailers who then sell the product to the public. Each one of the entities in this chain may have a web site which lists the products they have available. If the entities choose, they may simply use the picture and description of the product stored in the products table rather than coming up with their own pictures and descriptions of the products.

The invention has numerous other advantages and alternatives. First, it allows resellers to sell products to and from each other. Second, the products contained in the system may be either controlled or not controlled by the database administrator. In other words, members are free to modify their own product information rather than requiring the human-intervention of the entity controlling the administrative server. Third, it is not limited to "complete" channels of distribution. In other words, the system does not have to participate in every step of the channel of distribution for a particular product in order to provide a benefit to the members. Instead, it may implement only one or more portions of a channel of trade and, thus, complement prior art product ordering procedures. For example, the process does necessarily not start with the general public. It could start with any member ordering a product from any other member. Fourth, the system is not limited to products, but can also be used to offer and procure services such as labor services utilizing contractors, subcontractors and sub-subcontractors. Fifth, the system may be distributed or operate in parallel with other similar systems, such that it has one or more database servers, one or more database administrators, and one or more web servers. Sixth, by breaking a chain of distribution into discrete relationships, the system can handle extremely complex webs of relationships.

It is also not necessary for the administrative server 70 to host the reseller's individual web sites. For example, as shown in FIG. 1, resellers may host their own web sites on web servers 71–72, and send the product orders to administration server 70 via Internet 80.

Although the invention can be implemented using any known database system and language, yet another embodiment of the invention is set forth in Appendix A (incorporated herein by reference). The following fields of the database illustrated in that Appendix are similar to the fields shown in FIG. 2 above:

| FIG. 2 | Appendix A |
| --- | --- |
| Member Table.Name 111 | Member table, user_id field |
| Relationship Table.Product 121 | Manufacturer Accepted Part and/or Manufacturer Accepted Products Reference tables, part_id field |
| Relationship Table.Seller 122 | Manufacturer Accepted Part and/or Manufacturer Accepted Products Reference tables, src_id field |
| Relationship Table.Buyer 123 | Manufacturer Accepted Part and/or Manufacturer Accepted Products Reference tables, mfr_id field |
| Relationship Table.Price 124 | Manufacturer Accepted Part and/or Manufacturer Accepted Products Reference tables, src_price field |
| Product Table.Name 141 | Part table, part_id field |
| Product Table.Picture 142 | Part table, img_url field |
| Product Table.Description 143 | Part table, brief_descr field |
| Transaction Table.Agreement ID 151 | Order Header table, mfg_id and ord_id fields |
| Transaction Table.Quantity 152 | Order Line Item table, ord_qty fields |
| Transaction Table.Total Price 153 | Calculated multiplication of Order Line Item Table, ord_qty and unit_price fields |
| Transaction Table.Ship To 155 | Order Header Table, fields beginning "Sold_To" |
| Transaction Table.Personalization 2152 | Filename of image is stored in Image Table in img_src field. The design_id field of the Order Line Item table points to the appropriate record of the Image table. |

In operation, the modules set forth in the Appendix operate as follows: if Company A sells Product #10 to Company B who sells Product #10 to the general public, then the "sp_pipeline_mfr_add" module is utilized twice to add Company A and then Company B to the database; the "sp_pipeline_mfr_product_add" module is then utilized to add Product #10 to the list of products which Company A sells on the system; in order to represent the fact that Company A has agreed to sell products to Company B, an "organization" is created by utilizing the "sp_pipeline_org_add" module (the organization potentially having the identifier "Company A to B org"); the "sp_pipeline_org_product_add" module is then utilized to identify the products that are sold within that organization, the price and other terms (e.g. the module would be utilized to identify Product #10 and the compensation agreed to be paid by Company B to Company A for the product); another organization is created to represent Company B's sale of Product #10 to the pubic by again utilizing the "sp_pipeline mfr_product_add", sp_pipeline_org_add" and "sp_pipeline_org_product_add" modules; and when a member of the public does ultimately order Product #10 from Company B and Company B approves the order, the system utilizes the recursive algorithms of the "BOrder.cls" object to find organizations implicated by the order and pass the order information from one organization to the next. The "BProd.cls" object is utilized to provide product and line information for the order such as shipping info and details about the product being ordered. The "BOrg.cls" object is utilized to notify the companies about the transactions. Preferably, credit checks are performed each time an order is made from one member to another.

Unless stated to the contrary, use of the words such as "including," "containing," "comprising" and the like, means "including without limitation" and shall not be construed to limit any general statement that it a follows to the specific or similar items or matters immediately following it.

Most of the foregoing alternative embodiments are not mutually exclusive, but may be implemented in various combinations to achieve unique advantages. As these and other variations and combinations of the features discussed above can be utilized without departing from the invention as defined by the claims, the foregoing description of the embodiments should be taken by way of illustration rather than by way of limitation of the invention as defined by the claims.

What is claimed is:

1. A method of retrieving product distribution information comprising:
   (a) storing a plurality of agreements in computer-accessible memory where each agreement identifies a buyer, a seller and a product to be provided from said seller to said buyer,
   (b) retrieving a first agreement from said computer-accessible memory, wherein the first agreement comprises information that identifies a first entity as said buyer, a second entity as said seller, and a first product as said product,
   (c) processing the information retrieved for the first agreement with a computer processor, wherein the processor determines whether a second agreement stored in the computer-accessible memory identifies the second entity in said first agreement as a buyer in said the second agreement, and determines whether the product in the second agreement relates to the first product in the first agreement, and returns the identity of the second agreement depending on the result, and
   (d) generating a product order pursuant to the identified second agreement.

2. The method of claim 1 further comprising the step of storing a third agreement identifying the seller in the second agreement as a buyer in the third agreement, and where the product in the third agreement is related to the product in the second agreement.

3. The method of claim 1 wherein said product is a stamp.

4. The method of claim 1 wherein the product in the first agreement is a first product, the product in the second agreement is a second product, and the first and second products are related if the first product is a part or all of the second product.

5. The method of claim 1 wherein said product is a service or a product and a service.

6. The method of claim 1 wherein said steps of storing agreement information further comprises storing the compensation which seller agrees to accept for said product from said buyer.

7. The method of claim 6 wherein said compensation is the price of the product.

8. The method of claim 7 wherein said compensation is a commission.

9. The method of claim 1 wherein said first entity is a class of entities.

10. The method of claim 9 wherein said class is the general public.

11. The method of claim 9 wherein said step of retrieving said first agreement information comprises displaying to said first entity at least two products associated with those agreements identifying said first entity as said buyer, and determining said first agreement information based upon the product selected by an entity of said class.

12. The method of claim 1 further comprising the step of storing a description of said product.

13. The method of claim 12 wherein said description comprises an image, a textual description, or an image and a textual description.

14. The method of claim 1 further comprising the steps of:
   (e) said first entity requesting the product from said second entity and storing said request,
   (f) storing a request for said product by said second entity to said third entity based on the second agreement information.

15. The method of claim 14 further comprising notifying said third entity of said request.

16. The method of claim 14 wherein said requests includes the quantity of said product.

17. The method of claim 14 wherein said requests include the shipping destination or destinations of said product.

18. The method of claim 1 wherein said step of processing comprises searching for agreements wherein the buyer of the agreement identifies the second entity and the product of the agreement identifies the product of said first agreement.

19. The method of claim 1 further comprising the steps of storing additional agreements associated with said product; repeating said step of retrieving said second agreement by recursively assuming that some of the values of said first agreement are equal to the values of said second agreement.

20. The method of claim 19 wherein said step of repeating terminates when there is no agreement identifying the seller of said second agreement as a buyer of the same product in another agreement.

21. A method of providing information about a product including typesetting comprising:
   (a) storing data representing a product available from a mid-level entity to a class of customers in a computer accessible memory, said product including typesetting;
   (b) storing data, in a computer-accessible memory, representing an agreement by a top-level member to provide said product to said mid-level member;
   (c) receiving a customer request from a customer of said class of customers for said product, said customer request including typesetting information describing said typesetting;
   (d) storing said customer request in said computer accessible memory;
   (e) causing a computer processor to retrieve said agreement from said computer-accessible memory based on the identity of said product and the identity of said mid-level member associated with said customer request, wherein the agreement identifies the mid-level member as the recipient of the product provided by the top-level member;
   (f) processing the retrieved agreement to generate a second request that said top-level member provide said product to said mid-level member, said second request identifying said typesetting information;
   (g) transmitting said second request to said top level member.

22. The method of claim 21 wherein said class of customers comprises a single entity.

23. The method of claim 21 further comprising storing data representing an agreement by a third member to provide said product to said top-level member; retrieving said agreement by said third member based on the identity of said product and the identity of said top-level member.

24. The method of claim 23 wherein said typesetting information comprises an image.

25. The method of claim 24 further comprising the steps of receiving a plurality of requests from a plurality of customers of said class of customers, and wherein the image associated with one customer request is different from the image associated with another customer request.

26. The method of claim 25 wherein said step of storing said customer requests from said customers comprises storing said different images in the same file format.

27. The method of claim 26 further comprising the step of said top-level member retrieving said image.

28. The method of claim 27 further comprising the step of converting said image from said file format to a different file format before said step of said top-level member retrieving said image.

29. The method of claim 25 wherein said step of storing said customer requests from said customers comprises storing said different images in different file formats.

30. The method of claim 29 wherein said different file formats correspond with file formats used by said members.

31. The method of claim 21 further comprising the step of manufacturing said product.

32. The method of claim 21 wherein said product is a stamp and said typesetting relates to the impression on said stamp.

33. The method of claim 21 wherein said requests identify said typesetting information by reference to information stored in a database.

34. The method of claim 21 wherein said step of receiving said customer request comprises receiving said customer request over a global telecommunications network.

35. A method of retrieving information comprising:
   (a) storing first agreement Information and second agreement information in computer accessible memory, said agreement information identifying a buyer, a seller and a first product provided from said seller to said buyer,
   (b) identifying said first agreement information which identifies a first entity as said buyer, a second entity as said seller, and a first product as said product,
   (c) identifying said second agreement information which identifies said second entity as said buyer, a third entity as said seller, and a second product as said product,
   (d) retrieving said first agreement information from said computer accessible memory,
   (e) processing in a computer processing the first agreement information so as to retrieve said second agreement information based on whether the computer-accessible memory indicates that the second entity is indicated as being both a seller in the first agreement information and a buyer in the second agreement information.

36. A system for storing information about agreements between buyers and sellers, said system maintained by an administrator, said system comprising:
   (a) data stored in a computer accessible memory representing an agreement by a middle entity to provide a product to a bottom entity in exchange for compensation and an agreement by a top entity to provide a related product to said middle entity in exchange for compensation, none of said entities being said administrator, and
   (b) a processor for utilizing said data to process a request for said product from said bottom entity to said middle entity such that said request generates a request for said product from said middle entity to said top entity based on the middle entity being identified as the buyer in one of the stored agreements and the seller in the other stored agreement.

37. The system of claim 36 wherein said data further comprises another agreement by another entity to provide said product to said top entity.

38. A method of retrieving information relating to a request for personalized products, said method comprising:
   (a) storing, in computer-accessible memory, an agreement by a second entity to provide a product to a first entity,
   (b) storing, in computer-accessible memory, an agreement by a third entity to provide said product to said second entity,
   (c) requesting by said first entity said product from said second entity such that the request includes modifying the product in accordance with personalization information provided by said first entity, said personalization information being particular to said first entity, and
   (d) causing a computer processor to generate a request for said product from said second entity to the third entity, wherein the processor determines whether the second entity is common to the stored agreements, and wherein the processor includes the personalization information in the request from said second entity to said third entity.

39. The method of claim 38 wherein said personalization information comprises an image.

40. A method of selling products over the world-wide web, said method comprising:
   (a) providing a database centrally storing agreements between a plurality of members to sell a product;
   (b) sending a web page from a first member to a customer, said web page identifying a product that is the subject of one of said agreements of said database;
   (c) receiving a request for said product from said customer, said request including an image provided by said customer;
   (d) generating a first purchase order from said first member to a second member based on a second agreement stored in said database, said purchase order including said image, and
   (e) generating, with a computer processor, a second purchase order from said second member to a third member based on the processor determination of whether a third agreement is stored in the database such that the second member is indicated as a purchaser of the product from the third member said purchase order including said image.

41. The method of claim 40 further comprising the step of said members storing said agreements by sending information relating to such agreement to said database.

42. The method of claim 40 wherein said product comprises a stamp having an impression representing said image.

43. The method of claim 40 wherein said product comprises a printed item or sign containing said image.

* * * * *

UNITED STATES PATENT AND TRADEMARK OFFICE
CERTIFICATE OF CORRECTION

PATENT NO. : 6,901,376 B1
DATED : May 31, 2005
INVENTOR(S) : Steven J. Sculler and Mitchell L. Stevelman It is certified that error appears in the above-identified patent and that said Letters Patent is hereby corrected as shown below:

Column 1,
Line 33, "system is" should read -- system are --.

Column 2,
Line 32, "The may" should read -- This may --.
Line 61, "of customers" should read -- of customers, --.

Column 3,
Line 29, "and method" should read -- and the method --.

Column 4,
Line 1, "They system" should read -- The system --.

Column 7,
Line 22, ""Publics" should read -- "Public" --.

Column 8,
Line 11, "are all" should read -- is all --.

Column 12,
Line 3, "operate in" should read -- operated in --.

Column 13,
Line 17, "it a follows" should read -- it follows --.
Line 43, "buyer in said" should read -- buyer in --.

Column 14,
Line 26, "includes" should read -- include --.

Column 15,
Line 39, "Information" should read -- information --.
Line 40, "computer accessible" should read -- computer-accessible --.

UNITED STATES PATENT AND TRADEMARK OFFICE
CERTIFICATE OF CORRECTION

PATENT NO. : 6,901,376 B1
DATED : May 31, 2005
INVENTOR(S) : Steven J. Sculler and Mitchell L. Stevelman It is certified that error appears in the above-identified patent and that said Letters Patent is hereby corrected as shown below:

Column 15 (cont'd),
Line 51, "computer processing the" should read -- computer the --.

Signed and Sealed this

Eleventh Day of October, 2005

JON W. DUDAS
*Director of the United States Patent and Trademark Office*